(12) United States Patent
Nakamichi

(10) Patent No.: US 6,295,268 B1
(45) Date of Patent: Sep. 25, 2001

(54) DISK HOLDING DEVICE

(75) Inventor: Niro Nakamichi, Tokyo (JP)

(73) Assignee: Mechanical Research Corporation (JP)

( * ) Notice: Subject to any disclaimer, the term of this patent is extended or adjusted under 35 U.S.C. 154(b) by 0 days.

(21) Appl. No.: 09/390,116

(22) Filed: Sep. 3, 1999

(30) Foreign Application Priority Data

Sep. 6, 1998 (JP) .................................................. 10-289939
Sep. 6, 1998 (JP) .................................................. 10-289940

(51) Int. Cl.$^7$ .................................................. G11B 17/26
(52) U.S. Cl. .............................................. 369/178; 369/36
(58) Field of Search .................................... 369/178, 218, 369/201, 202, 206, 36, 38, 34, 179, 192, 193

(56) References Cited

U.S. PATENT DOCUMENTS

| | | | |
|---|---|---|---|
| 2,308,880 | * | 1/1943 | Hokanson ................................ 369/34 |
| 2,395,026 | * | 2/1946 | Weaver .................................. 369/205 |
| 2,960,340 | * | 11/1960 | Seidel et al. ............................ 369/34 |
| 3,236,525 | * | 2/1966 | Moody ..................................... 369/34 |
| 4,644,515 | * | 2/1987 | Allebest et al. ........................ 369/32 |
| 5,561,657 | * | 10/1996 | Ogawa .................................. 369/179 |
| 5,730,031 | * | 3/1998 | Paul et al. ............................ 74/490.7 |
| 5,859,832 | * | 1/1999 | Osada .................................... 369/178 |
| 5,872,748 | * | 2/1999 | Shindo et al. ........................... 369/38 |
| 6,097,693 | * | 8/2000 | Nakamichi ............................ 369/270 |
| 6,178,152 | * | 1/2001 | Becker et al. ......................... 369/178 |

FOREIGN PATENT DOCUMENTS

61061262A * 3/1986 (JP) .
04061080A * 2/1992 (JP) .

* cited by examiner

*Primary Examiner*—David L. Ometz
*Assistant Examiner*—Franklin D. Altman, III
(74) *Attorney, Agent, or Firm*—Morrison Law Firm (57) ABSTRACT

A cam member, having a cam groove on its outer surface, is slidably mounted on a rotating shaft to allow for movement of disk holders between a playback position and a stored position. In one embodiment, the cam groove is continuous about the cam member, making two complete rotations around the cam member. When a first disk holder is at the playback position, the cam groove engages the second disk holder at the stored position. When the second disk holder is selected to be played, rotation of the cam member causes the first disk holder to move to a stored position on an opposite end of the cam member while the second disk holder is in the playback position. The overall height required for such a disk holding device is constant, providing for a multiple disk playback device with minimal height requirements.

9 Claims, 14 Drawing Sheets

PRIOR ART

DISK HOLDING DEVICE

BACKGROUND OF THE INVENTION

The present invention relates to a disk holding device capable of holding a plurality of disks. More specifically, the present invention relates to a disk holding device, capable of holding a plurality of disks, having minimal height requirements.

Japanese laid-open patent publication number 10-64160 discloses a conventional changer-type disk playback device. A cam member, having a cam groove around its perimeter, is disposed along an axis direction parallel to the orientation in which a plurality of disks are held. A disk holding member engages with the cam groove. The cam member rotates so that the disks in the device move along the holding direction, allowing the selection of a particular disk.

Figure 17:
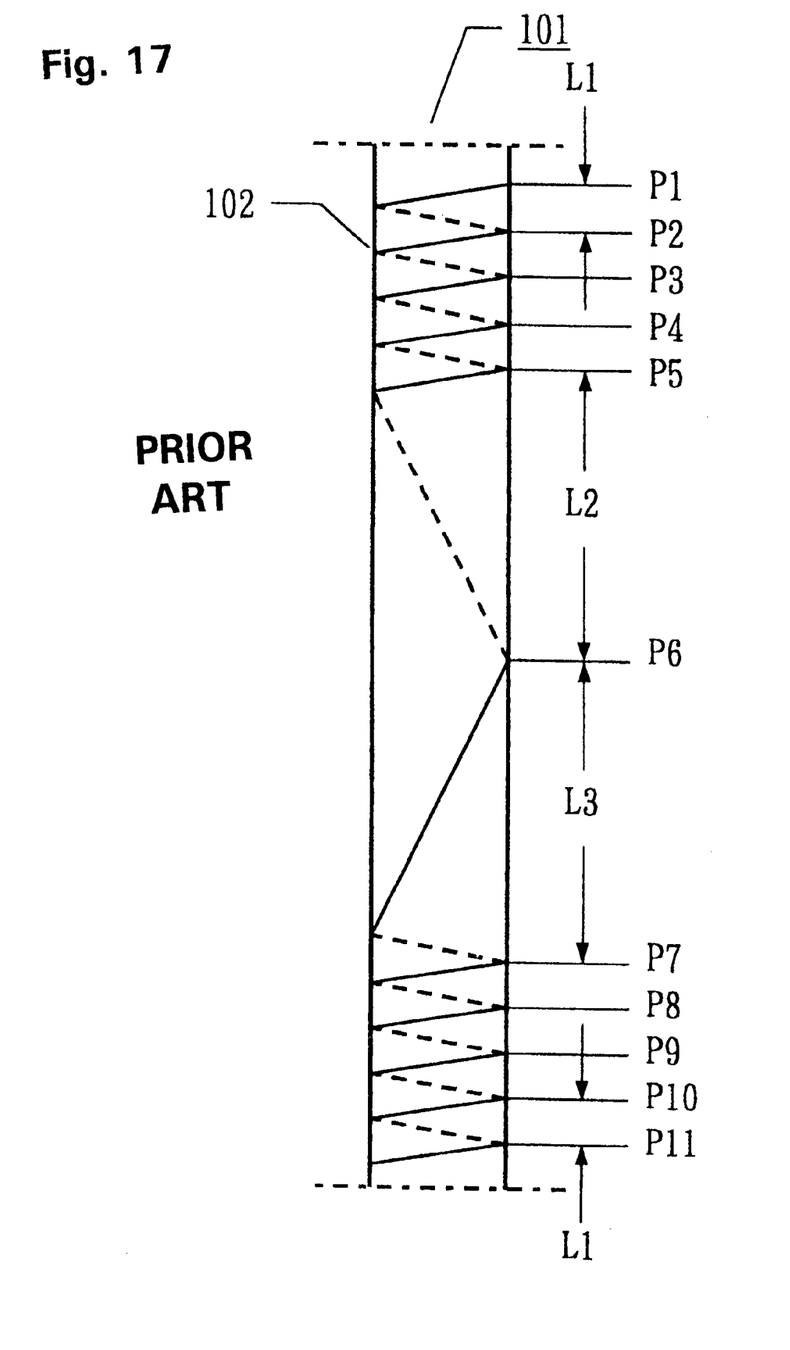
FIG. 17 is a side-view drawing of a conventional cam member.

Referring to FIG. 17, a conventional cam member 101 has a roughly cylindrical outer shape. An outer perimeter of cam member 101 has a single spiraling cam groove 102. An engagement section of a holding member (not shown in the figure) engages with cam groove 102. As cam member 101 rotates, the holding member is displaced along the axis of cam member 101. In the example shown in the figure, six holding members engage with cam member 101. When cam member 101 rotates, a selected disk out of the six disks is displaced to a playback position P6.

At playback position P6, cam groove 102, having a pitch wider than that of other sections, separates holding position P6 from the upwardly adjacent holding position P5 by a distance L2. Cam groove 102 also separates holding position P6 from the downwardly adjacent holding position P7 by a distance L3. Thus, a damper can be moved between position P5 and position P6 while playback means, such as an optical pickup, a turn table, or the like, is moved between position P6 and position P7. Thus, the disk is played back without pulling the disk out. Pitches L1, between positions P1 through P5 above position P6, and positions P7 through P11 below position P6, is a pitch allowing the disk holding members to be tightly stacked together, thus contributing to a smaller height dimension for the device.

Figure 18:
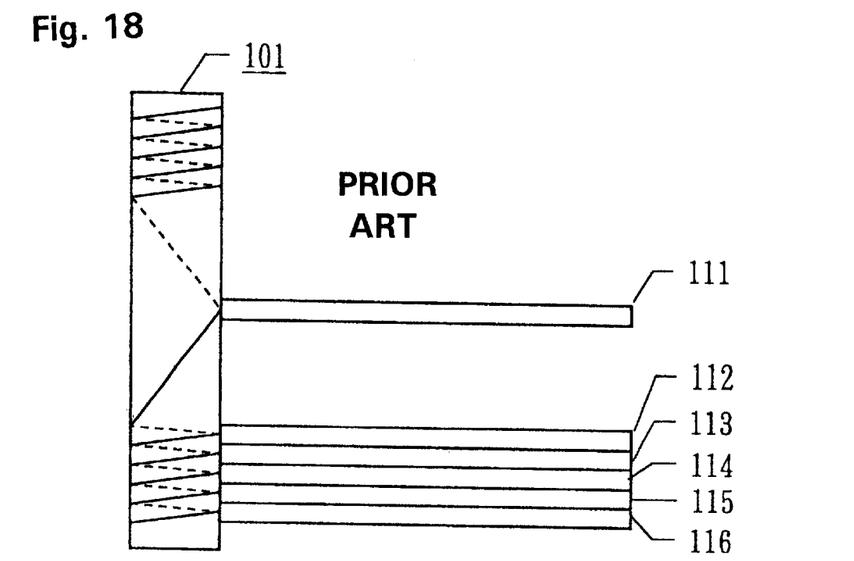
FIG. 18 is a side-view drawing of the conventional cam member of FIG. 17, showing a relationship between the disk holders and the cam member.
Figure 19:
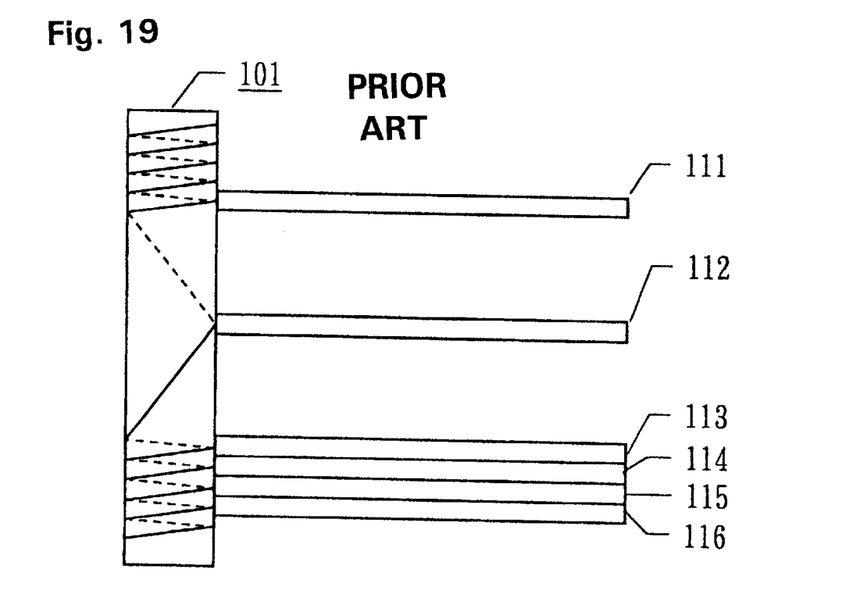
FIG. 19 is a side-view drawing of the conventional cam member of FIG. 17, showing a relationship between the disk holders and the cam member.
Figure 20:
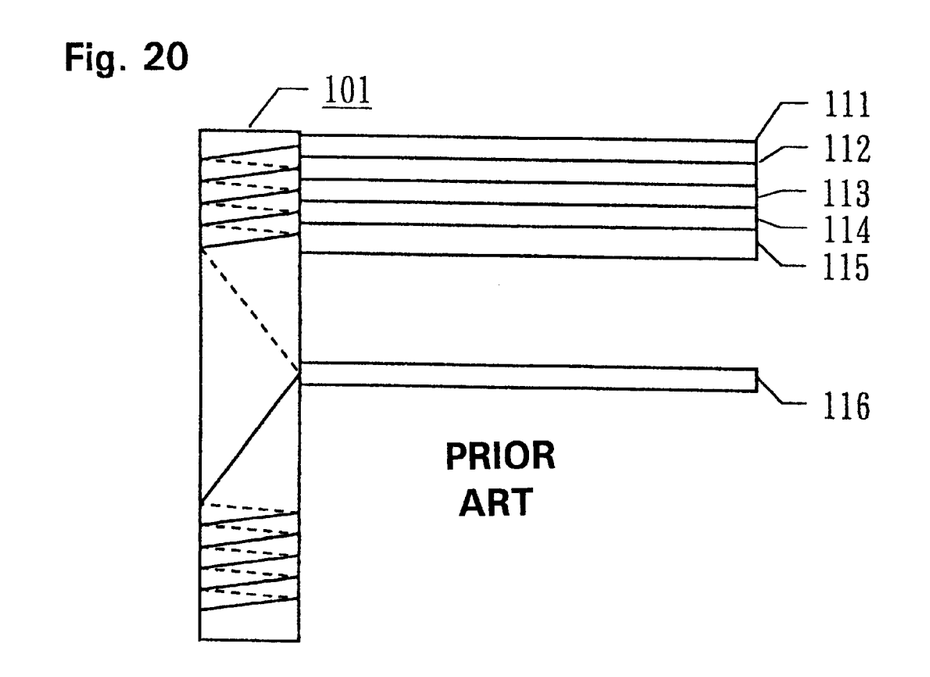
FIG. 20 is a side-view drawing of the conventional cam member of FIG. 17, showing a relationship between the disk holders and the cam member.

Referring to FIGS. 18 through 20, the method by which six disk holding members 111 through 116 move. Referring specifically to FIG. 1 8, when the first disk is to be played, second through sixth disk holding members 112 through 116 are respectively positioned to positions P7 through P11 (see FIG. 17) so that the disk holding members are tightly stacked. Playback means, such as an optical pickup, a turn table (not shown in the figure), and the like, are inserted into the space between disk holding members 111 and 112. This allows a single disk held in disk holding member 111 to be played.

When cam member 101 rotates one turn clockwise, the second disk is placed in a playback state, as shown in FIG. 19. Second disk holding member 112 is now positioned at position P6 (see FIG. 17). Similarly, when cam member 101 rotates five turns clockwise from the state shown in FIG. 18, the sixth disk is placed in a playback state as shown in FIG. 20.

Referring back to FIG. 17, the space above disk playback position P6 requires a minimum distance w, where w is four times holding pitch L1 for disk holding members 111 through 116 plus a prescribed distance L2, between position P6 and position P5, i.e., L2+(L1×4). Similarly, the space required below playback position P6 must be at least a distance of L3+(L1×4).

Thus, cam member 101 requires height clearance to stack five disk holding sections both above and below playback position P6. This is an obstacle in attempts to reduce the height dimension of the device.

OBJECTS AND SUMMARY OF THE INVENTION

It is an object of the present invention to provide a disk holding device which overcomes the foregoing problems.

It is another object of the present invention to provide a disk holding device capable holding a plurality of disks within a prescribed minimal height.

The disk holding device of the present invention includes a plurality of disk holders and a cam member. Each of the plurality of disk holders holds a disk. The cam member engages with the plurality of disk holders so that a selected disk holder separates by appropriate distance from adjacent disk holders. The cam member moves the disk holder relative to a chassis in a direction perpendicular to a recorded surface of the disk. The cam member moves in a direction opposite to the direction in which the disk holders are moved.

Briefly stated, the present invention provides a cam member, having a cam groove on its outer surface, which is slidably mounted on a rotating shaft to allow for movement of disk holders between a playback position and a stored position. The cam groove is continuous about the cam member, making two complete rotations around the cam member. When a first disk holder is at the playback position, the cam groove engages the second disk holder at the stored position. When the second disk holder is selected to be played, rotation of the cam member causes the first disk holder to move to a stored position on an opposite end of the cam member while the second disk holder is played. The overall height required for such a disk holding device is constant, providing for a multiple disk playback device with minimal height requirements.

According to an embodiment of the present invention, there is provided a disk holding device, comprising: a cam member slidably mounted on a rotatable shaft such that rotation of the rotatable shaft rotates the cam member; a cam groove continuously formed in the cam member; the cam groove having an angle relative to the cam member; a plurality of disk holders moveable by rotation of the cam member between a stored position and a playback position; the stored position being located in at least one of below the cam member and above the cam member; and the playback position being located at a location along the cam member.

According to another embodiment of the present invention, there is provided a disk holding device comprising: a plurality of disk holders; at least one cam member engagable with at least one of the plurality; the cam member slidably positioned on a rotatable shaft; rotation of the rotatable shaft effecting rotation of the cam member; and engagement means for engaging each of the plurality on said cam member, whereby the disk holders are movable in a direction of an axis of the rotatable shaft.

According to a further embodiment of the present invention, there is provided a disk holding device comprising: a plurality of disk holders, each of the plurality of disk holders capable of holding a disk; at least one cam member engaging with the plurality of disk holders to separate a selected disk holder by an appropriate distance from adjacent disk holders; the cam member moving the disk holders relative to a chassis, in a direction perpendicular to a recorded surface of the disk; and the cam member moving in a direction opposite to a direction of movement of the disk holders.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
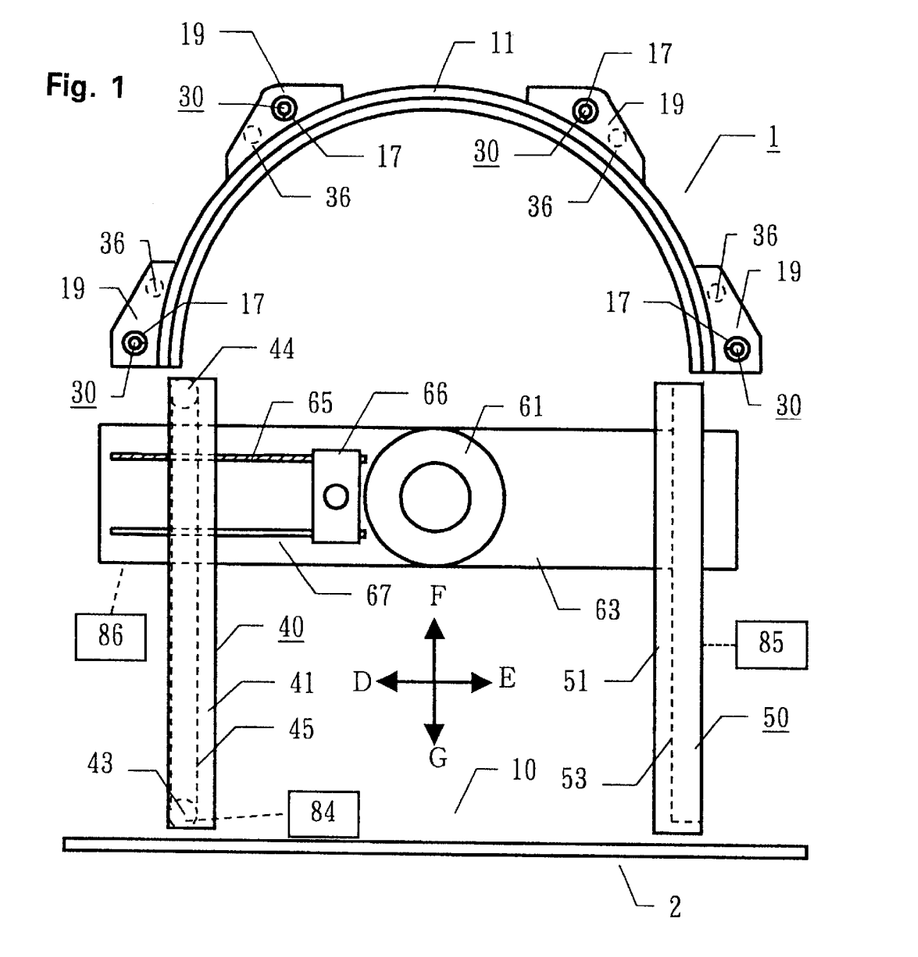
FIG. 1 is a schematic plan drawing of a disk playback device according to an embodiment of the present invention.

Referring to FIG. 1, a changer-type disk playback device 1, capable of holding six disks, is shown in an initial state free from holding disks. Toward the back of playback device 1 is a first arcuate disk holder 11, which supports a perimeters of 12 cm disks over an angular range of approximately 180 degrees. Disk holder 11 supports the disk only at the disk's perimeter. Thus, even if disk holder 11 damages a disk, the effect on the data recorded on the disk is minimized. Additional disk holders 12–16 (see FIG. 9) are present below uppermost disk holder 11.

Referring to FIG. 1, a set of flanges 19, having circular openings 17, are on disk holder 11. An engagement pin 18 projects from circular opening 17. Engagement pin 18 fits against a single cam groove 33 on a cam member 30 in order to allow the displacement of disk holder 11 in a perpendicular direction relative to the plane of FIG. 1. Additional disk holders 12–16 are structured identically with disk holder 11, including flanges 19, circular openings 17, and engagement pins 18.

Figure 7:
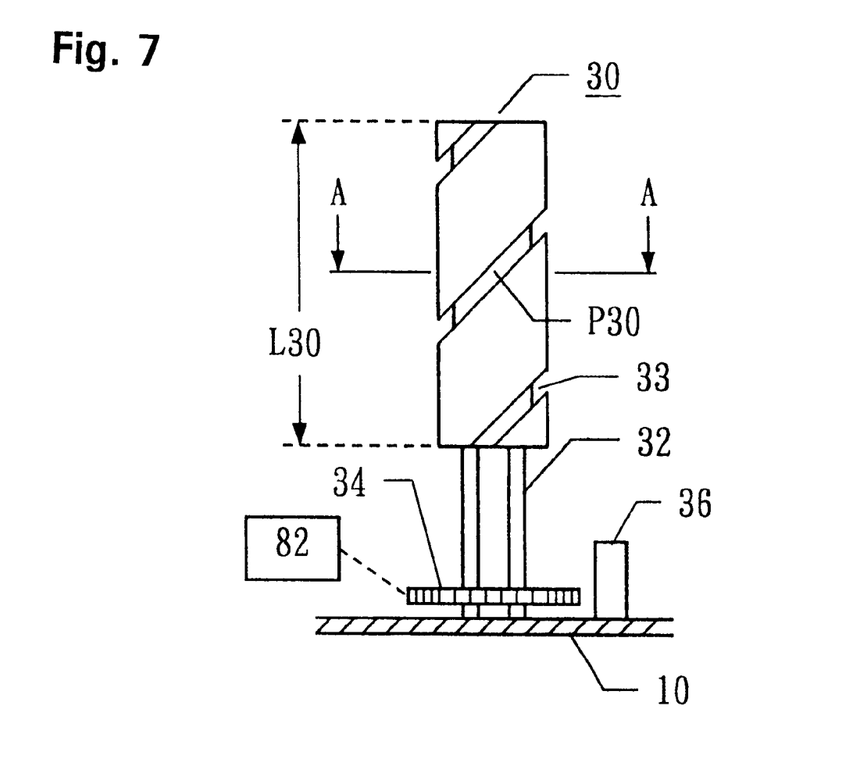
FIG. 7 is a side-view drawing of a cam member according the present invention.
Figure 8:
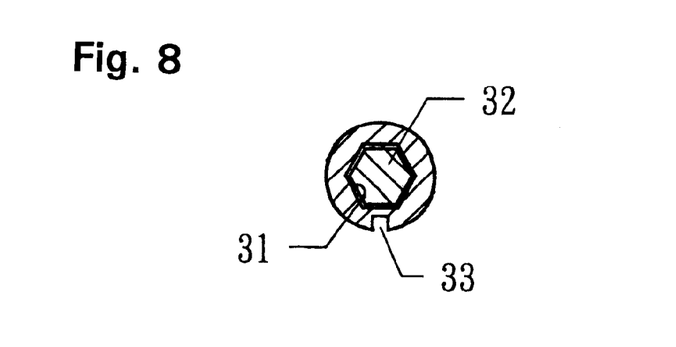
FIG. 8 is a cross-section drawing along line A—A of FIG. 7.

Referring to FIGS. 7 and 8, the roughly cylindrical cam member 30, having a length L30, has single cam groove 33 on a surface thereof. A hexagonal center opening 31 is at the center of cam member 30. A hexagonal rotating shaft 32, rotatably supported by a chassis 10, is inserted into center opening 31. Thus, when rotating shaft 32 rotates, cam member 30 also rotates. Cam member 30 can be displaced along the axis of rotating shaft 32.

A position P30 on cam groove 33 is at the intersection with the cross-section surface formed by line A—A. Position P30 is the position at which the disk holder is disposed when a disk is to be played. Cam groove 33 does not simultaneously engage with engagement pins 18 for all disk holders 11–16. Instead, only the disk holder to be played back is fitted to cam groove 33 and moves to the playback position P30. The other disk holders are positioned above and below cam member 30.

Engagement pin 18 of the disk holder adjacent to cam member 30 positioned above cam member 30 abuts an upper surface of cam member 30 and is kept at that position. The disk holder positioned above that is stacked atop the disk holder abutting the upper surface of cam member 30. Of the disk holders positioned below cam member 30, the disk holder adjacent to chassis 10 is mounted on four mounting sections 36, positioned between the disk holder and chassis 10, to abut flanges 19. The disk holder positioned between this disk holder and cam member 30 is stacked atop the disk holder mounted on mounting section 36.

A spur gear 34 is on rotating shaft 32. The direction and position of rotation of cam member 30 is controlled by a cam member driving mechanism 82 formed from a motor, reduction gears, and the like. The corresponding spur gears 34 of each cam member 30 are interconnected so that cam members 30 can be rotated in the same direction at the same rotation angle.

Figure 2:
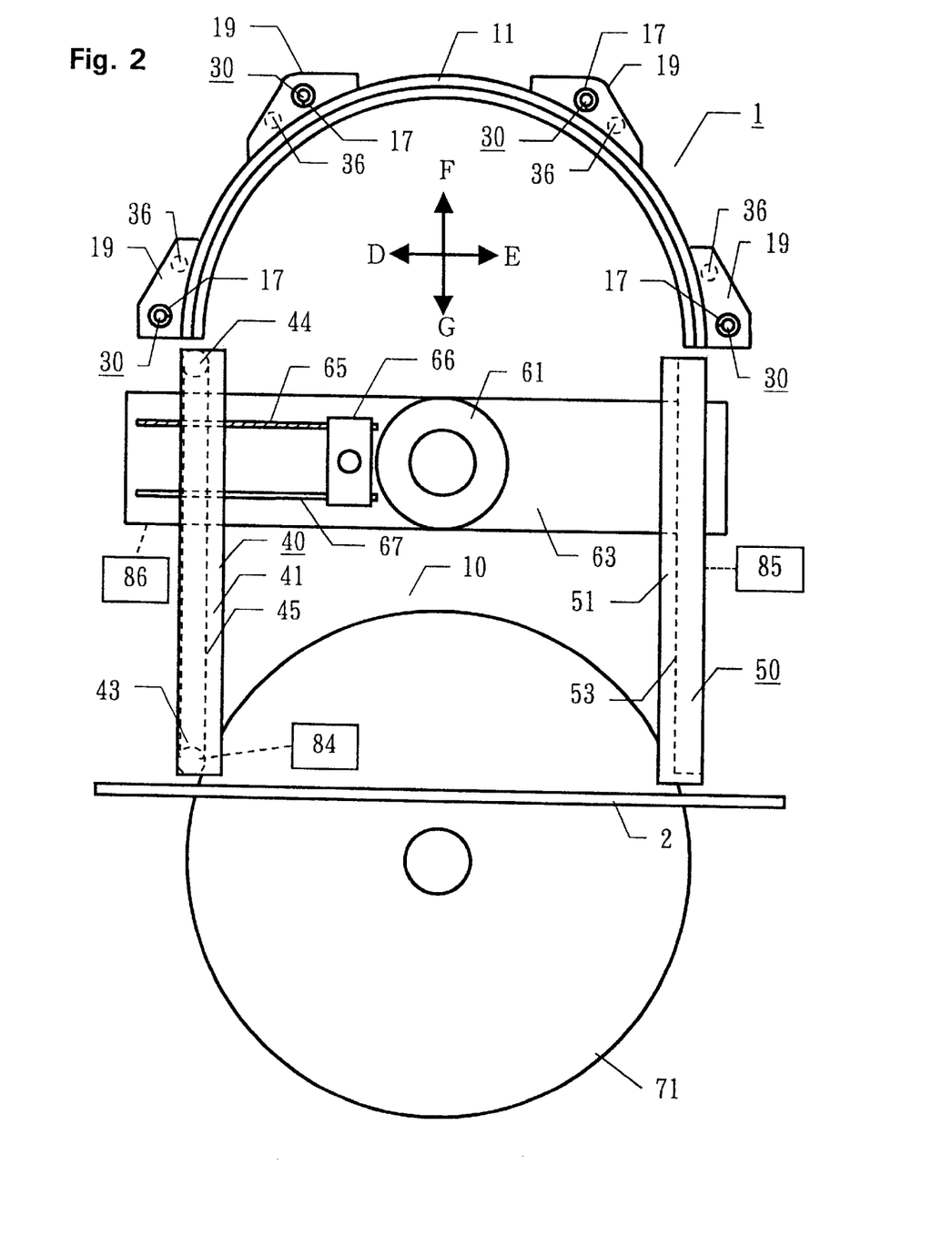
FIG. 2 is a schematic plan drawing of the disk playback device of FIG. 1 while a disk is being loaded.

Referring to FIGS. 1 and 2, a disk 71 is inserted from an opening (not shown) formed on a front panel 2 of device 1. Disk 71 is transferred to disk holders 11–16 by disk transferring means including a belt driving mechanism 40 (to the left in the figures) and a guide mechanism 50 (to the right in the figures). Upper and lower guide plates 41 and 42 are positioned on either side of the edge of disk 71. An endless drive belt 45, positioned between upper and lower guide plates 41 and 42, extends between a driven pulley 44 and a drive pulley 43. An appropriate pulley driving mechanism 84, such as a motor, drives driven pulley 44 and driven pulley 43.

Guide mechanism 50 includes upper and lower guide plates positioned on either side of the edge of disk 71. A guide wall 53, abutting the disk edge, is between guide plates 51 and 52. Belt driving mechanism 40 and guide mechanism 50 are capable of being displaced along the D–E direction shown in FIG. 1 by a suitable connecting mechanism (not shown in the figure). Guide mechanism 50 and belt driving mechanism 40 are connected to each other so that when guide mechanism 50 moves a prescribed amount in the direction of arrow E, belt driving mechanism 40 moves in the opposite direction of arrow D by the same amount. A belt/guide driving mechanism 85, formed from a motor or the like, allows belt driving mechanism 40 and guide mechanism 50 to move along the D–E direction.

Thus, when disk 71 is supported between drive belt 45 and guide wall 53, drive pulley 43, driven by pulley driving mechanism 84, rotates in a counter-clockwise direction. This rotation causes disk 71 to rotate clockwise while being transferred in the direction of an arrow F, perpendicular to the D–E direction. This movement causes disk 71, inserted into device 1 from the opening formed on front panel 2, to be transferred to the selected disk holder. If drive pulley 43 rotates clockwise by pulley driving mechanism 84, disk 71 rotates counter-clockwise while being transferred in the direction of an arrow G, in the opposite direction from arrow F. This rotation causes disk 71 to be pulled out from a selected disk holder, transferring disk 71 to a position where a section of disk 71 projects from front panel 2.

A turn table 61, on which disk 71 is mounted during playback, rotates by a spindle motor (not shown in the figures). Turn table 61, preferably a self-chucking turn table which does not requires a damper to clamp disk 71, is on a mechanism chassis 63. A suitable motor (not shown in the figure) rotates a feed screw 65, which causes an optical pickup 66, positioned on mechanism chassis 63, to be displaced between an inner perimeter and an outer perimeter of disk 71. When the information recorded on disk 71 is played back, disk 71 rotates by turn table 61 while optical pickup 66 applies a laser beam to disk 71 and reads the reflected light. The playback means is formed by at least turn table 61 and optical pickup 66.

A guide rail 67, on mechanism chassis 63, allows displacement and guiding of optical pickup 66. Mechanism chassis 63 is capable of being displaced along the F–G direction, shown in FIG. 1, by a mechanism chassis driving mechanism 86 formed from a motor or the like. Mechanism chassis 63 is also able to move in a direction perpendicular to the recorded surface of disk 71 to allow for clamping operations.

Mechanism chassis 63, belt driving mechanism 40, and guide mechanism 50 are all together vertically displaced in response to the selection of a disk.

The following is a description of how disk 71 is transferred by a disk transferring means in the structure described above.

Referring to FIG. 1, in the initial state, when a disk is loaded, the distance between drive belt 45 of belt driving mechanism 40 and guide wall 53 of guide mechanism 50 is set to be smaller than the diameter of disk 71. In this initial state, engagement pin 18, formed on first disk holder 11, is positioned at position P30 of cam groove 33 on cam member 30. The second through sixth disk holders 12–16 are stacked on holder mounting section 36 on chassis 10.

The following is a description of the operations performed when disk 71 is inserted into device 1. When disk 71 is inserted into the opening in front panel 2(not shown), the insertion force causes belt driving mechanism 40 to be displaced in the direction of arrow D. Guide mechanism 50 is displaced in the direction of arrow E by the same amount, resulting in the state shown in FIG. 2. These displacements trigger drive pulley 43 of belt driving mechanism 40 to be driven counter-clockwise by pulley driving mechanism 84. When drive belt 45 starts rotating counter-clockwise, disk 71, supported between drive belt 45 and guide wall 53, is transferred in the direction of arrow F while rotating clockwise, thus loading disk 71 into device 1.

Figure 3:
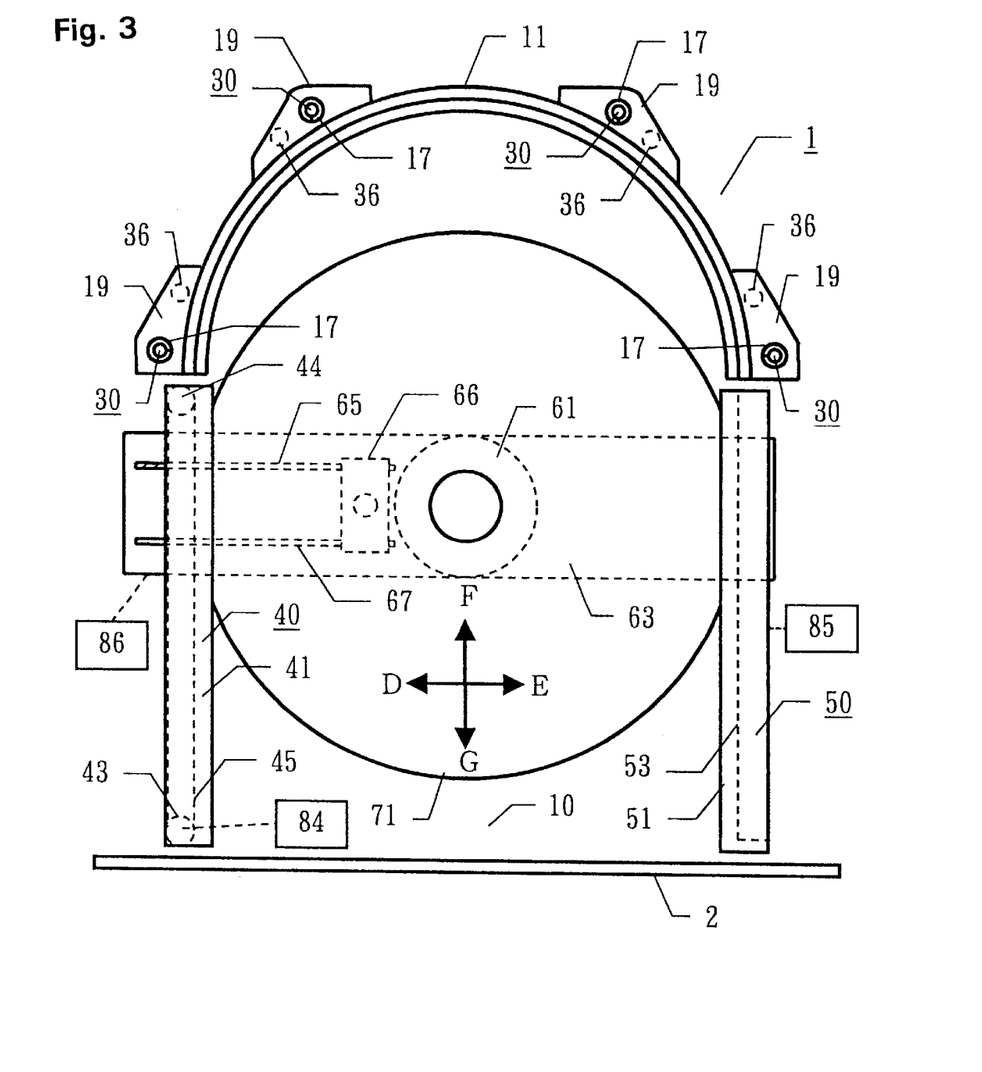
FIG. 3 is a schematic plan drawing of the disk playback device of FIG. 1 having a disk is in a playback position.

Referring to FIG. 3, disk 71 continues to be transferred by the rotation of drive belt 45 to a playback position while being supported between drive belt 45 and guide wall 53. At this playback position, disk 71 is not in contact with disk holder 11, which is aligned at the same height as disk 71.

Figure 4:
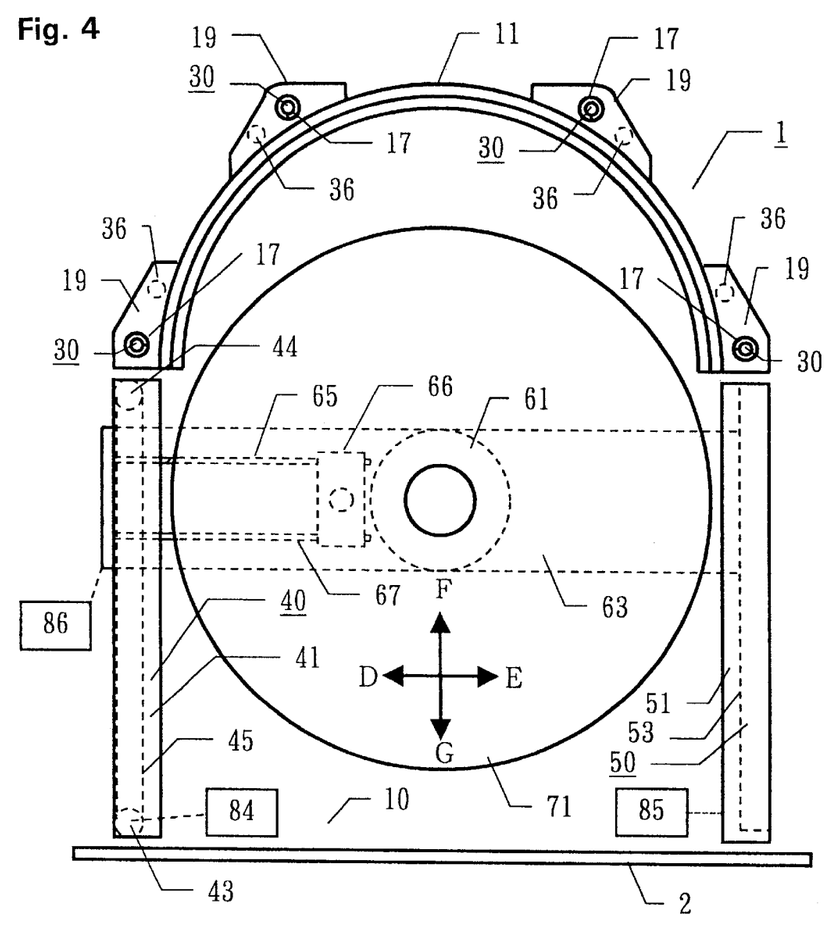
FIG. 4 is a schematic plan drawing of the disk playback device of FIG. 1 having a disk which can be played.

Referring to FIG. 4, mechanism chassis driving mechanism 86 moves mechanism chassis 63 in a direction perpendicular to the recorded surface of disk 71 causing mechanism chassis 63 to approach disk 71. Disk 71 is clamped to turn table 61. Belt/guide driving mechanism 85 then displaces belt driving mechanism 40 and guide mechanism 50 in the direction of arrow D and arrow E respectively so that they move away from disk 71. Disk 71 is then rotated at an appropriate speed.

The following is a description of the operations involved when, after playback of disk 71 has been completed, disk 71 is stored in disk holder 11, allowing a different disk to be stored in second disk holder 12.

Figure 5:
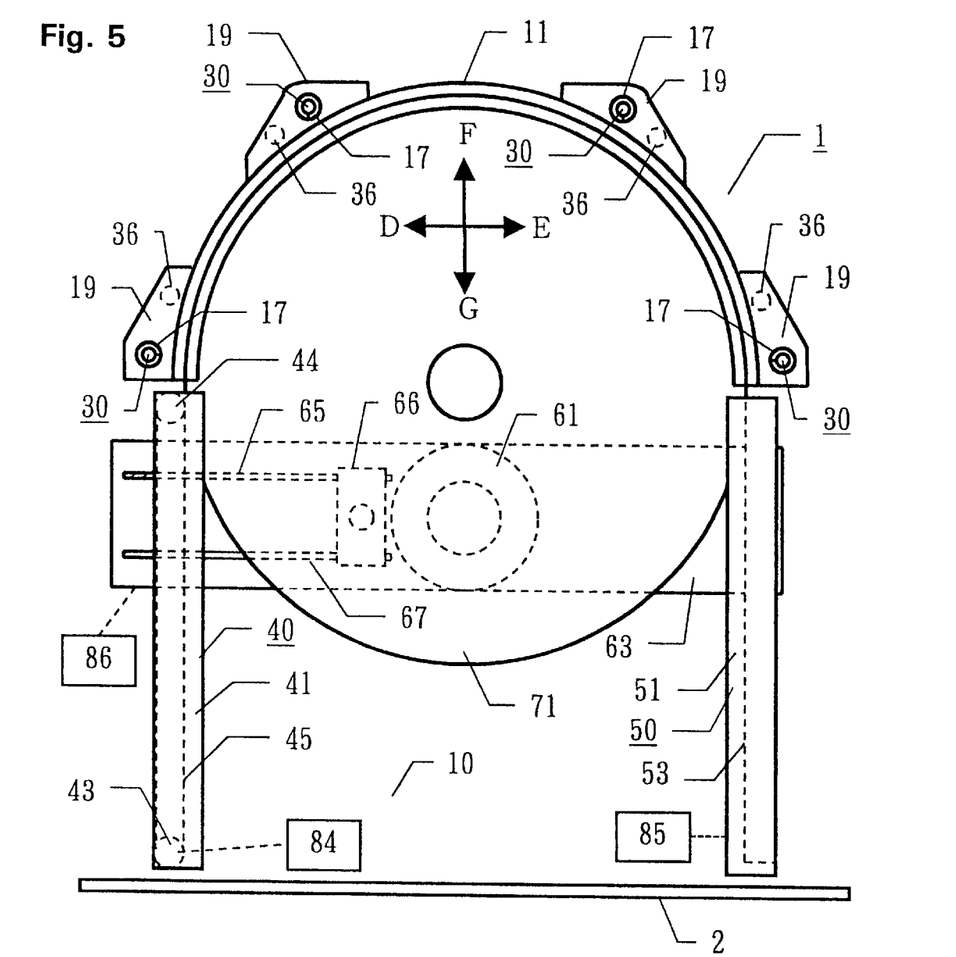
FIG. 5 is a schematic plan drawing of the disk playback device of FIG. 1 having a disk is in a holding position.

Referring to FIG. 5, after playback of disk 71 has been completed, belt driving mechanism 40 and guide mechanism 50 are moved in the direction of arrow E and arrow D respectively by belt/guide driving mechanism 85. This results in disk 71 being supported between drive belt 45 and guide wall 53. Then, mechanism chassis driving mechanism 86 moves mechanism chassis 63 away from disk 71, releasing disk 71 from its clamped state on turn table 61. Pulley driving mechanism 84 then rotates drive belt 45 counter-clockwise so that disk 71 is displaced in the direction of arrow F, causing approximately 180 degrees of the perimeter of disk 71 to be supported by disk holder 11.

Figure 6:
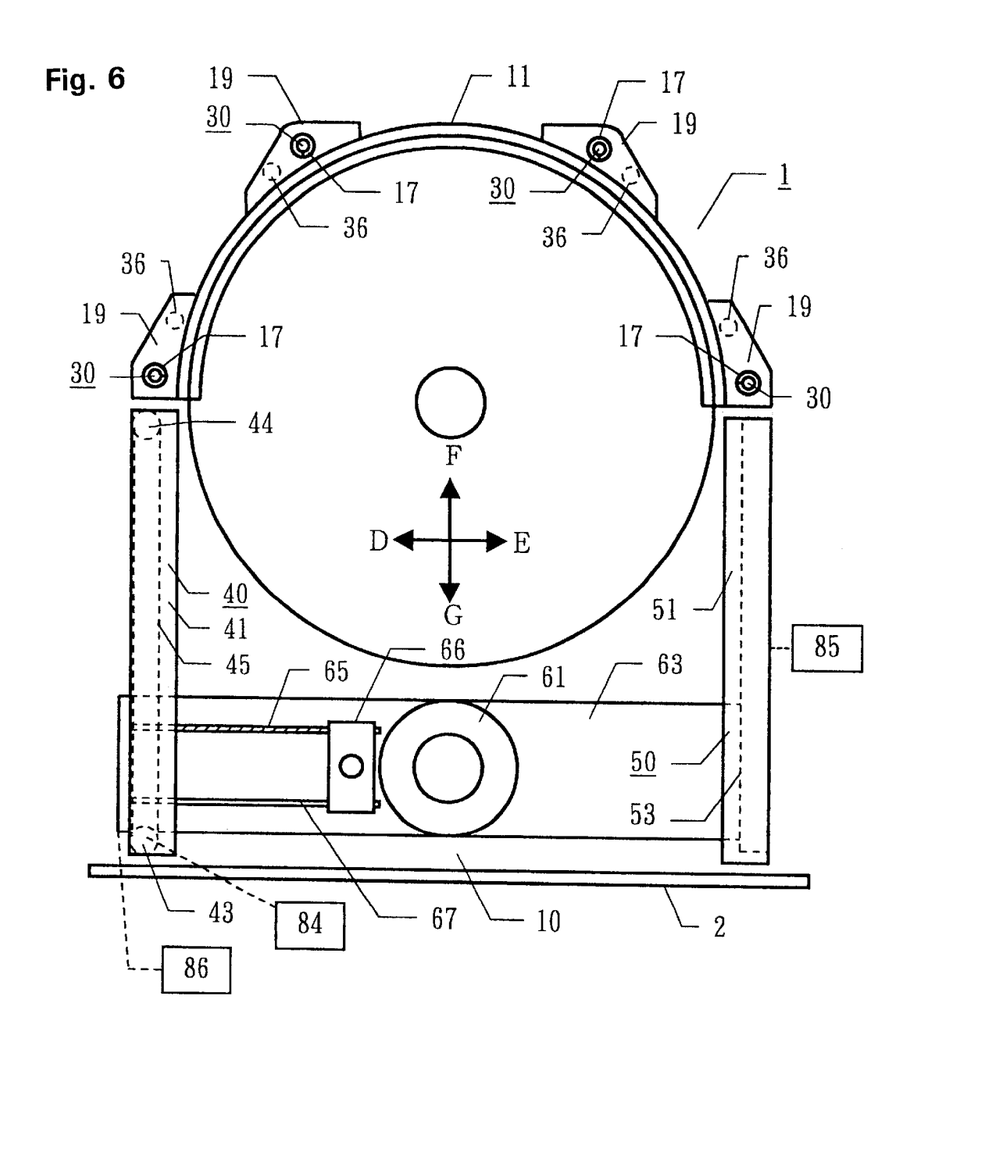
FIG. 6 is a schematic plan drawing of the disk playback device of FIG. 1 in a position to select a disk.

Referring to FIG. 6, mechanism chassis driving mechanism 86 moves mechanism chassis 63 in the direction of arrow G so that mechanism chassis 63 is brought to a standby position where it does not overlap with disk 71 supported in disk holder 11. Then, belt/guide driving mechanism 85 displaces belt driving mechanism 40 and guide mechanism 50 in the direction of arrow D and arrow E respectively so that drive belt 45 and guide wall 53 are moved away from the edges of disk 71.

Referring to FIGS. 9 through 16, in order to select disk holder 12, cam member 30 rotates by cam member driving mechanism 82. The figures show the relationship between disk holders 11–16 and cam member 30, which controls the vertical displacement of disk holders 11–16. The following is a description of how cam member 30 displaces disk holders 11–16.

Figure 9:
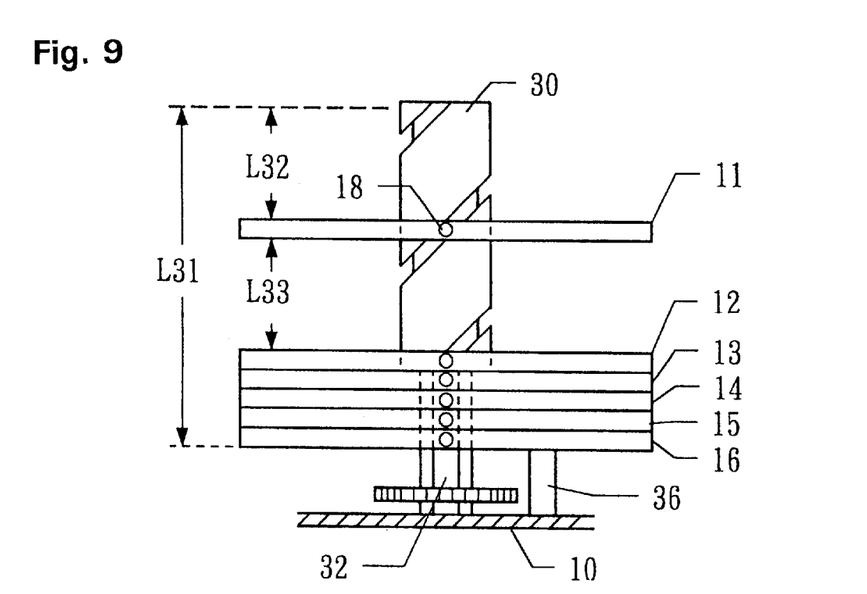
FIG. 9 is a side-view drawing of the cam member of FIG. 7 showing a relationship between the disk holders and the cam member.
Figure 10:
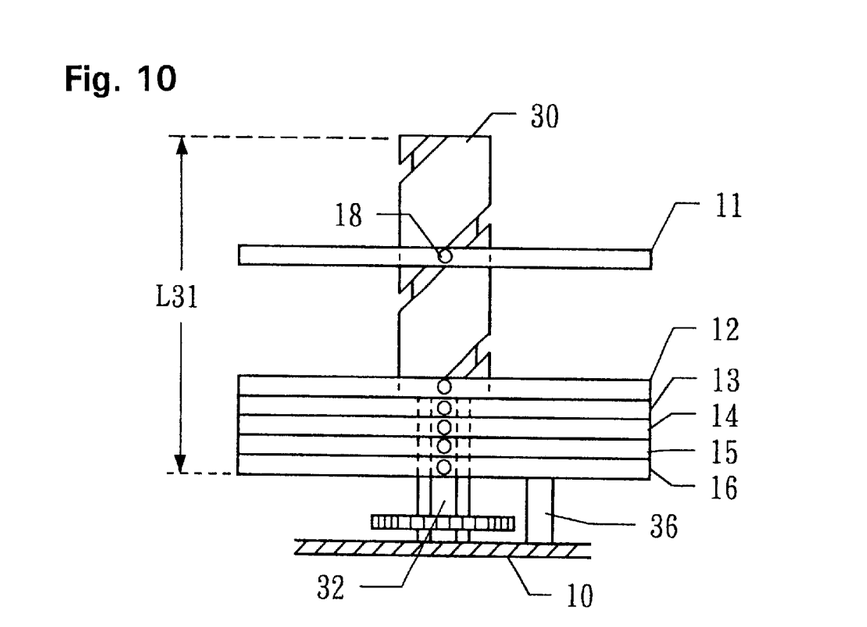
FIG. 10 is a side-view drawing of the cam member of FIG. 7 showing a relationship between the disk holders and the cam member.

Referring specifically to FIG. 9, first disk holder 11 is selected. In this state, first disk holder 11 is positioned at playback position P30 (see FIG. 7) of cam groove 33 on cam member 30. Second through sixth disk holders 12–16 are stacked on holder mounting section 36, with only engagement pin 18 of second disk holder 12 being fitted to cam groove 33 at a lowermost position. In this state, the contact between engagement pin 18 of disk holder 12 and cam groove 33 causes cam member 30 to be supported by disk holder 12.

A distance L33, between disk holder 11 and disk holder 12, is a distance that allows insertion of mechanism chassis 63, on which are mounted turn table 61, optical pickup 66, and the like, when the disk held in disk holder 111 is to be played back as shown in FIG. 4. A distance L32 indicates the distance needed above the disk held in disk holder 11 when the disk is to be played back. A distance L3 1 indicates the range of vertical displacement of disk holders 11–16 involved in selecting a disk.

Distance L30 (see FIG. 7) of cam member 30 is roughly the same as the sum of distances L32 and L33, which need to be provided above and below a disk that is to be played back. Distance L3 1 is roughly the same as the sum of distance L30 of cam member 30 and the thickness of four stacked disk holders.

Figure 11:
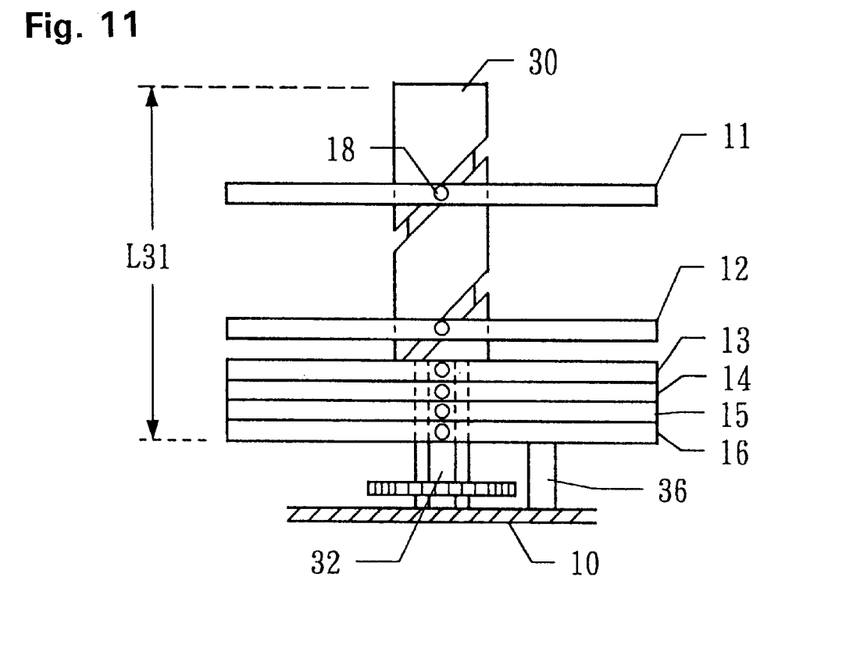
FIG. 11 is a side-view drawing of the cam member of FIG. 7 showing a relationship between the disk holders and the cam member.

The following is a description of the operations involved when cam member 30 is rotated clockwise in order to store the second disk into disk holder 12. When cam member 30 is rotated slightly clockwise from the position shown in FIG. 9, cam member 30 moves downward along cam groove 33 as it rotates, resulting in the position shown in FIG. 10. As cam member 30 continues to rotate clockwise, the lower side of cam member 30 abuts engagement pin 18 of third disk holder 13, preventing cam member 30 from moving down further. Thus, cam member 30 continues to rotate while maintaining the height shown in FIG. 10. As a result, disk holder 12 moves upward in the figure along cam groove 33. Similarly, disk holder 11 also moves upward along cam groove 33. FIG. 11 shows the movement of both first disk holder 11 and second disk holder 12.

Figure 12:
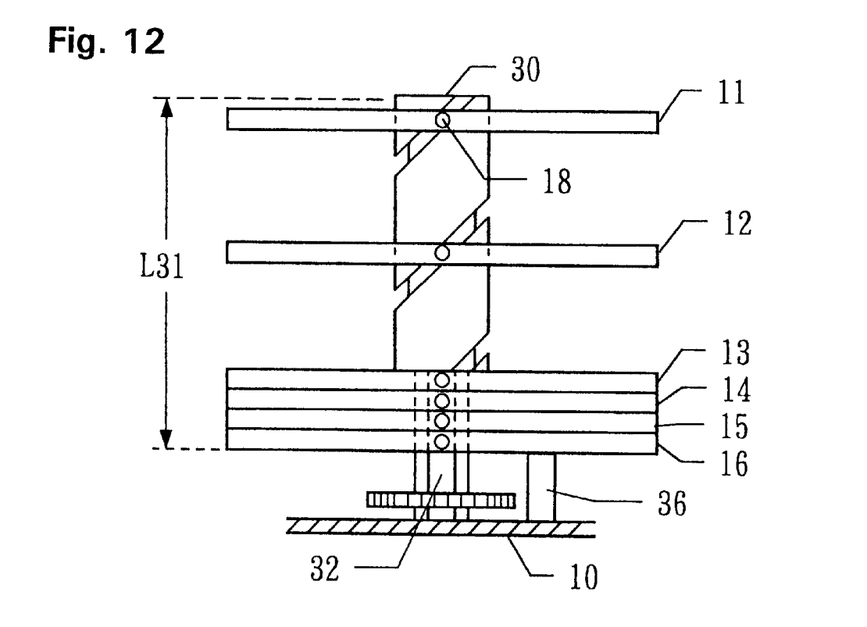
FIG. 12 is a side-view drawing of the cam member of FIG. 7 showing a relationship between the disk holders and the cam member.

Referring to FIG. 12, cam member 30 is supported by engagement pin 18 of disk holder 13 while it rotates further in a clockwise direction. As cam member 30 rotates even further in a clockwise direction, the insertion of engagement pin 18 of disk holder 13 into cam groove 33 causes cam member 30 to move downward while rotating along cam groove 33. Engagement pin 18 of first disk holder 11 comes out from cam groove 33, to be supported on an upper surface of cam member 30.

Figure 13:
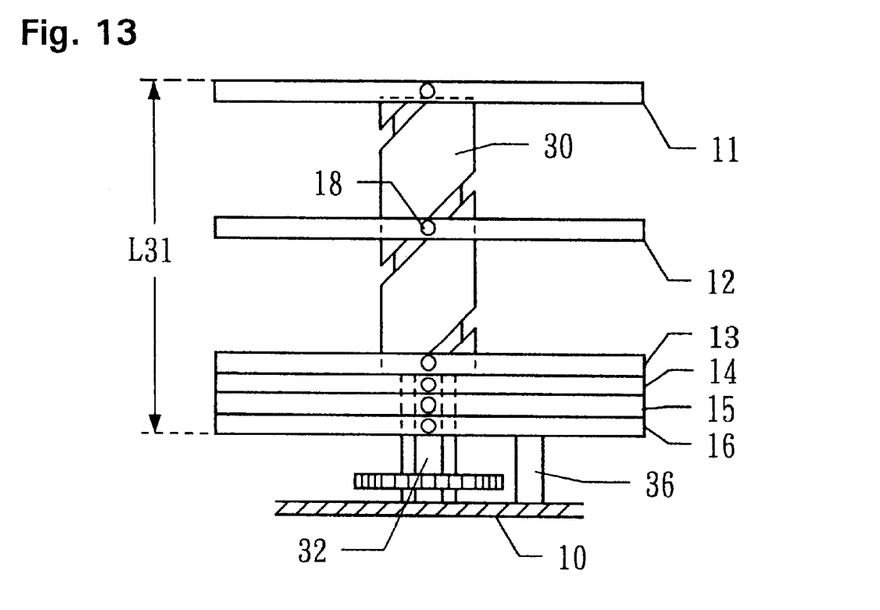
FIG. 13 is a side-view drawing of the cam member of FIG. 7 showing a relationship between the disk holders and the cam member.

Referring to FIG. 13, second disk holder 12 is positioned at playback position P30 of cam groove 33, allowing the loading or playing back of the second disk.

Thus, between the state shown in FIG. 9, where the disk held in first disk holder 11 can be played back, and the state shown in FIG. 13, where the disk held in second disk holder 12 can be played back, cam member 30 has moved along rotation shaft 32. As a result, the height of the disk to be played back changes. Similarly, mechanism chassis 63 moves vertically, but a detailed description of this is omitted.

Figure 14:
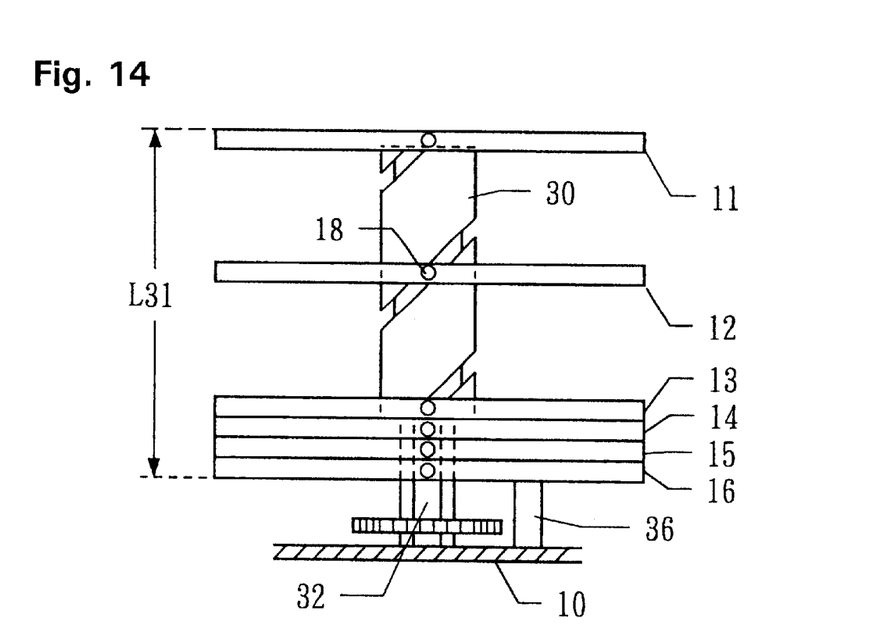
FIG. 14 is a side-view drawing of the cam member of FIG. 7 showing a relationship between the disk holders and the cam member.
Figure 15:
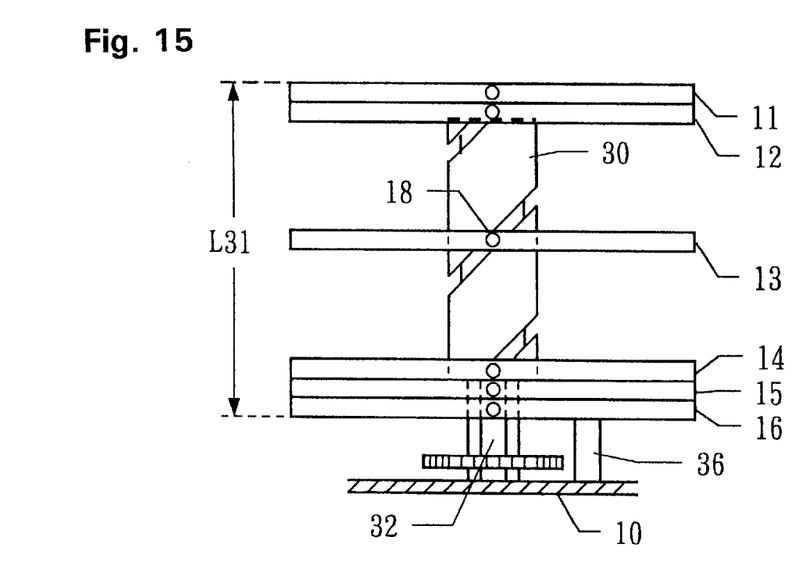
FIG. 15 is a side-view drawing of the cam member of FIG. 7 showing a relationship between the disk holders and the cam member.

Referring to FIGS. 14 and 15, when a third disk is to be held in third disk holder 13, cam member 30 rotates further clockwise from the state shown in FIG. 13, where the second disk is to be played back. Engagement pin 18 of disk holder 13 inserts into cam groove 33. Cam member 30 rotates along cam groove 33 while moving slightly downward. This causes the lower end of cam member 30 contact engagement pin 18 of fourth disk holder 14, preventing cam member 30 from moving any further downward. As a result, can member 30 is kept at the height shown in FIG. 14 while it rotates. This causes disk holder 13 to move upward in the figure along cam groove 33. Similarly, disk holder 12 also moves upward along cam groove 33 so that third disk holder 13 is brought to the playback position.

Figure 16:
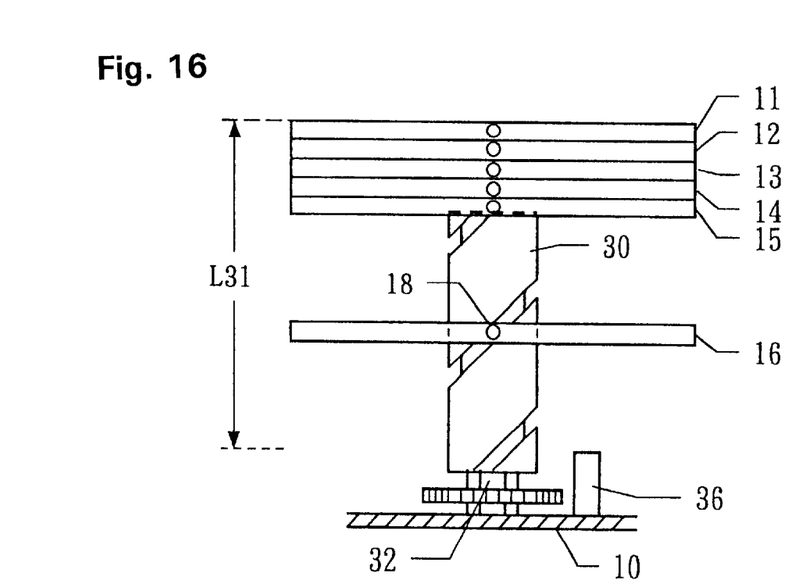
FIG. 16 is a side-view drawing of the cam member of FIG. 7 showing a relationship between the disk holders and the cam member.

Referring to FIG. 16, when cam member 30 rotates three turns from the state shown in FIG. 15, disk holder 16 moves to playback position P30 of cam member 30.

In the embodiment described above, the position of the disk holder supporting a disk to be played back or loaded stays the same relative to cam groove 33, but cam member 30 moves up and down based on disk selection. Thus, the height of the playback disk relative to chassis 10 changes. As a result, the opening formed on front panel 2 must have a height that at least extends over the height of disk holder 11 and disk holder 16, shown in FIGS. 9 and 16. Entry of dust and the like can be prevented by providing a movable sealing panel or the like on front panel 2.

The present invention is not restricted to the embodiment described above and can take on various other forms. For example, in the embodiment described above, the disk holders supporting the disks supports the edges of the disks. Thus, when a disk is to be played back, the disk must be moved parallel to its recording surface as it is pulled out from the disk holder.

However, it is also possible to use a disk holder that is formed as a plate on the upper surface of which is disposed a cavity for supporting the disk. With this disk holder, the disk and the disk holder are separated by having the turn table lift up the disk holder at the holding position from the disk. Thus, there is no need to draw the disk out from the disk holder as described for the embodiment above, allowing the holding position to be the same as the playback position when seen from a direction perpendicular to the recorded surface of the disk.

Disk transferring means used for the embodiment above is not restricted to an endless drive belt. It is also possible to use various mechanisms for supporting disks, such as drive rollers and the like.

In the embodiment above, the disk holder is moved by a cam member formed with a cylindrical outer shape and a cam groove formed as a spiral groove on the outer perimeter. However, it is also possible to perform the same operations using a different member without departing from the spirit of the present invention.

As described above, in the device according to the present invention, the cam member is moved vertically so that there is no need to provide a space above and below the cam member to allow the disk to be recessed. This provides a superior disk holding device that allows the height dimension of the device to be reduced or allows a greater number of disks to be held.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk holding device, comprising:
   a cam member slidably mounted on a rotatable shaft such that rotation of said rotatable shaft rotates said cam member;
   a cam groove continuously formed in said cam member;
   said cam groove having an angle relative to said cam member;
   a plurality of disk holders moveable by rotation of said cam member between a stored position and a playback position;
   said stored position being located in at least one of below said cam member and above said cam member; and
   said playback position being located at a location along said cam member.

2. A disk holding device according to claim 1, further comprising:

an engagement pin, on each of said plurality of disk holders, engagable with said cam groove, whereby rotation of said cam member causes said engagement pin to engage with said cam groove, causing one of said plurality of disk holders to move along said cam member during rotation of said cam member.

3. A disk holding device according to claim 2, wherein:

said cam groove making sufficient revolutions around said cam member, to engage at least one of said plurality of disk holders with said cam member at any one time;

said cam member and a thickness of each of said plurality of disk holders not engaged with said cam groove defining a height, said height remaining constant when each of said plurality of disk holders engages said cam groove and moves along said cam member during rotation of said cam member.

4. A disk holding device comprising:

a plurality of disk holders;

at least one cam member engagable with at least one of said plurality of disk holders;

said cam member slidably positioned on a rotatable shaft;

rotation of said rotatable shaft effecting rotation of said cam member; and engagement means for engaging each of said plurality of disk holders on said cam member, whereby said disk holders move in a first direction of an axis of said rotatable shaft, while said cam member slidably moves in a second, opposite direction when moving a disk holder from a storage position to a playback position.

5. A disk holding device according to claim 4, further comprising:

a cam groove on an outer surface of said cam member;

said cam groove being a continuous groove, spanning a distance of said cam member, having an angle over said distance; and each of said plurality of disk holders having an engagement pin engagable with said cam groove, whereby rotation of said cam member causes said engagement pin to engage with said cam groove, causing one of said plurality of disk holders to move along said cam member during rotation of said cam member.

6. A disk holding device according to claim 5, wherein:

said cam groove making exactly two revolutions around said cam member, whereby a maximum of two of said plurality of disk holders are engaged with said cam member at any one time;

said cam member and a thickness of each of said plurality of disk holders not engaged with said cam groove defining a height, whereby said height remains constant when each of said plurality of disk holders engages with said cam groove and moves along said cam member during rotation of said cam member.

7. A disk holding device according to claim 5, further comprising:

a playback position at which said disk contained within said disk's respective disk holder is capable of being played back; and said distance providing a sufficient space between said disk at said playback position and adjacent disks to allow for playback of said disk.

8. A disk holding device comprising:

a plurality of disk holders, each of said plurality of disk holders capable of holding a disk;

at least one cam member engaging said plurality of disk holders to separate a selected disk holder by an appropriate distance from adjacent disk holders;

said cam member is a rotating cam including a rotating shaft parallel to said direction of movement of said disk holders;

said cam member moving said disk holders relative to a chassis, in a direction perpendicular to a recorded surface of said disk;

said cam member moving in a direction opposite to a direction of movement of said disk holders; and a cam groove is on an outer surface of said rotating cam.

9. A disk holding device according to claim 8, further comprising:

a disk playback means for playing back disks; and said disk playback means being inserted in said appropriate distance.

* * * * *